May 17, 1966 E. D. PHILLIPS 3,251,635
LIQUID SEALING MEANS FOR STIRRING APPARATUS
Filed Aug. 8, 1962
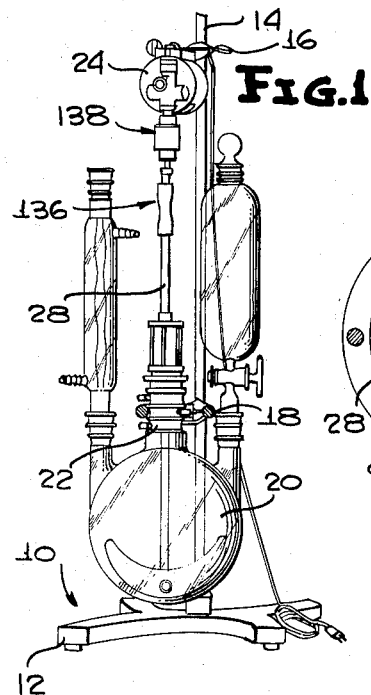
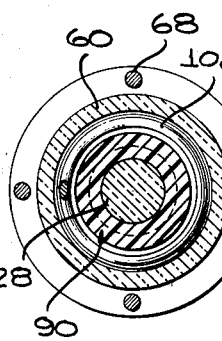
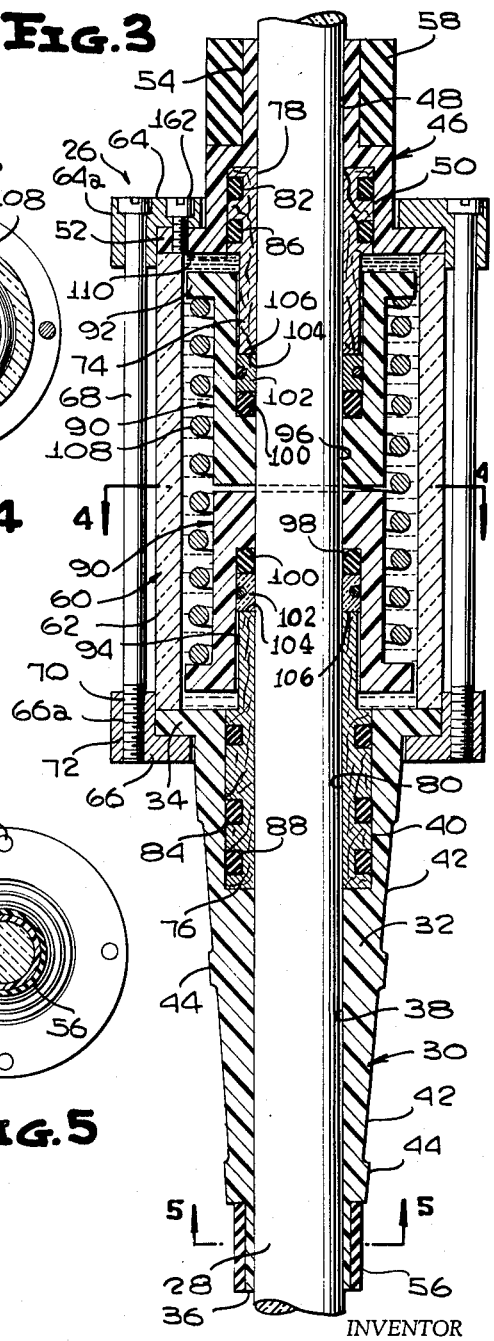
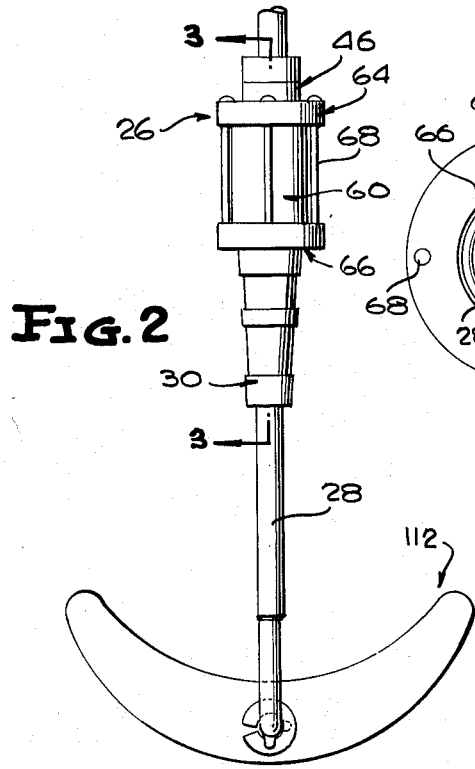
INVENTOR
EDWIN D. PHILLIPS
BY *Shoemaker and Mattare*
ATTORNEYS

United States Patent Office 3,251,635
Patented May 17, 1966

3,251,635
LIQUID SEALING MEANS FOR STIRRING
APPARATUS
Edwin D. Phillips, Middlesex County, N.J.
(P.O. Box 188, Middlesex, N.J.)
Filed Aug. 8, 1962, Ser. No. 215,613
17 Claims. (Cl. 308—36.2)

This invention relates to improvements in equipment for chemical, food, and other laboratories and is directed particularly to improvements in leakage preventing seals and especially seals or sealing means associated with stirring equipment.

In many operations performed in laboratories the stirring of materials in sealed flasks is carried out. In these stirring operations a stirring rod may pass through the neck of the flask and carry a stirring blade on its lower end within the flask while the outer or upper end of the rod is connected with a suitable source of power for rotating the rod. Since the flasks under certain conditions must be kept tightly sealed or closed while such a stirring operation is being carried out, a perfect seal must be maintained at all times between the rotating stirring rod and a seal or closure member in the mouth or neck of the flask to prevent liquids or vapors creeping along the stirring rod or shaft and escaping from the flask, where the flask may be kept under pressure from within during the stirring operation and it is also important that such a perfect seal be maintained to prevent the passage of dust or other material along the stirring rod and into the flask, on those occasions where a reduced pressure may be maintained in the flask.

In the use of vacuum desiccating equipment there are in use types of slip joint seals. However such seals at present available use a sealing fluid, such, for example, as mercury, which would be objectionable in the carrying out of certain operations such as in the performance of distillation operations connected with the production of food or in other systems where the use of mercury would constitute a hazard. In addition to this where mercury seals are used torsional forces are usually very high which means that excessive strains are placed upon rotating elements and considerable wear of parts occurs.

One object of the present invention is to provide stirring equipment of an improved character wherein a perfect seal may be maintained between a rotating shaft or stirring rod and a flask sealing or closing body without the employment of a liquid sealing medium which would be unsuitable for use in laboratories dealing with food, pharmaceuticals, and the like.

Another object of the invention is to provide a rotary sealing unit employing a novel sealing liquid or fluid in which relatively movable parts of the seal are bathed at all times and which fluid is non-toxic and entirely safe for use where all types of foods, pharmaceuticals or chemicals generally are handled.

Other objects and advantages of the present invention will become apparent as the description of the same proceeds and the invention will be best understood from a consideration of the following detailed description taken in connection with the accompanying drawings forming a part of the specification and wherein:

FIG. 1 is a view in perspective of an assembly of chemical apparatus or laboratory equipment showing the stirring system of the present invention in operative relationship with such equipment.

FIG. 2 is a view in elevation of the fluid and friction seal unit of the invention in operative connection with a glass stirring rod.

FIG. 3 is a longitudinal section on an enlarged scale, taken substantially on the line 3—3 of FIG. 2.

FIG. 4 is a transverse section taken substantially on the line 4—4 of FIG. 3.

FIG. 5 is a transverse section taken substantially on the line 5—5 of FIG. 3.

Referring now more particularly to the drawings: FIG. 1 shows an assemblage of chemical apparatus or laboratory equipment of a type with which the elements of the stirring system of the present invention are designed to be used.

It is, of course, to be understood that much of the glassware and other elements shown in FIG. 1 are illustrative only of one set up in association with which the apparatus of the present invention is designed to be used and is not intended to restrict in any way the equipment with which the stirring apparatus may be used.

Referring again to FIG. 1 there is shown a clamp supporting structure which is generally designated 10 and which comprises the conventional base 12 and vertical standard 14 upon which conventional clamps 16 and 18 may be mounted for the support of various items of laboratory equipment.

The clamp 18 is here shown as supporting a flask 20, of globular form, by the neck portion 22 thereof while the clamp 16 is shown as supporting an electric motor 24 with which an element of the hereinafter described apparatus is connected for carrying out a stirring operation of the contents of the flask 20. The other pieces of chemical apparatus illustrated, in themselves form no part of the present invention.

As hereinbefore set forth the stirring system of the present invention is designed for the carrying out of stirring operations in chemical vessels, such as flask 20, in such a manner that the vessel will be kept tightly closed or sealed to prevent the escape of fluids therefrom, if there is a high internal pressure, or to prevent the entrance of fluids thereinto if there is a low pressure in the vessel so that a tight seal must be maintained at all times around the stirring rod or shaft which passes into the vessel and carries the stirrer blade on its lower end and which is connected at its outer or upper end with a suitable power means for effecting its rotation.

The numeral 26 generally designates the seal unit or stirring rod seal.

The stirring rod which passes through the unit 26 and forms an integral part of the entire apparatus, is generally designated 28.

Referring now particularly to FIG. 3 for a detailed description of the unit 26, the numeral 30 designates an elongate sealing sleeve which is formed of a suitable elastomer, perferably the synthetic resin Teflon.

The sleeve 30 has the long tapered lower portion 32, the top end of which is defined by the encircling flange 34. At the end of the tapered portion 32, the sleeve 30 is externally reduced in diameter to form the thin terminal neck portion 36.

The sealing sleeve also has a longitudinal passage or bore therethrough as indicated at 38 and this bore through a portion of its length at the upper end is of slightly enlarged diameter as indicated at 40, for the purpose hereinafter set forth.

The tapered portion 32 of the sealing sleeve has the external surface provided with the relatively wide shallow encircling channels 42 whereby there are formed the lands 44 which engage the inner surface of the neck of a flask into which the sealing sleeve is inserted. The Teflon flask seal 30 has certain advantages in an apparatus of the character herein disclosed over rubber, cork, or other types of material which may be used for this purpose. The mouths of flasks and other receptacles such as bottles and the like used in laboratories, are conventionally ground to receive a ground glass stopper.

The inner surface of the mouth of such a receptacle is also tapered and the taper of the sealing sleeve 30 corresponds to the taper of the receptacle mouth into which it is to be inserted so that the lands 44 will tightly engage the tapered surface of the receptacle mouth.

The Teflon material when channeled as indicated at 42 will form a tight engagement with the mouth of a receptacle when it is forced with moderate pressure thereinto. In this operation, because of the formation of the lands 44 between the channeled or recessed areas 42, the material will be distorted in such a manner that when the force is released and the resilient material returns to its former shape and diameter it in effect expands against the surrounding glass surface and thus establishes a tight seal and a firm grip with the surface. This action is particularly noticeable if a slight twist is given to the sleeve or a correspondingly shaped stopper, as it is forced into the mouth of the receptacle since such twist tends to reduce the diameter of the sleeve, which diameter is restored when the twisting force is released. Thus the synthetic resin material of the particular type known as Teflon, has been found to be particularly well suited for use in an apparatus of the character herein described and it also exhibits a self lubricating quality when it is tightly engaged around a smooth highly polished surface such as a glass stirring rod.

Surrounding the stirring rod 28 at the top of the seal unit and cooperating with the sealing sleeve 30, is a short top sleeve 46 which has the longitudinal passage 48 therethrough and which passage at the lower end is of enlarged diameter as indicated at 50.

The top sleeve 46 is encircled at its lower end by the flange 52 which is of the same diameter as the flange 34 of the sealing sleeve 30.

A terminal portion of the top sleeve 46 is exteriorly reduced in diameter to form the relatively thin walled neck portion 54.

Constricting bands 56 and 58 are placed, respectively, about the thin walled neck portion 36 and 54. These bands compress the neck portions tightly against the stirring rod and thus provide additional seals between the contacting surfaces.

The numeral 60 generally designates an elongate cylindrical casing which comprises the transparent cylinder 62, preferably of glass, and top and bottom collars 64 and 66 respectively.

The collars rest upon or engage the flanges 34 and 52 of the sleeves 30 and 46 and the cylinder 62 is interposed between these flanges 34 and 52 as shown and the collars have thickened outer portions 64a and 66a, which encircle the peripheries or edges of the flanges 34 and 52 and also portions of the cylinder 62 and these collars are coupled together by the long screws 68 which pass through suitable openings in the collars as shown, the screws being headed on one end to seat in suitable openings in the collars and being screw threaded on the other end as indicated at 70 to engage in the threaded openings 72 in the collars. Thus the collars will be drawn together and press the flanges 34 and 52 tightly against the top edges of the transparent cylinder 62 to thereby form a fluid tight casing.

In this casing is a sealing fluid as hereinafter more particularly described.

The numerals 74 and 76 respectively designate upper and lower bearing sleeves which have the axial bores 78 and 80 respectively, therethrough. These bores 78 and 80 are of the same diameter as the passages 38 and 48 of the upper and lower sleeves and the glass stirring rod passes therethrough and is snugly received therein.

The bearing sleeves 74 and 76 are in axially spaced relation as shown and the outer or remote ends of these sleeves are respectively positioned in the large end portions 40 and 50 of the sleeve passages 38 and 48, while inner end portions of the bearing sleeves extend into the casing 60 and into adjacent cup elements, about to be described.

The bearing sleeves 74 and 76 are respectively provided in their exterior surfaces with the encircling channels 82 and 84 and in the channels of these two sleeves there are positioned the resilient rings 86 and 88 which are compressed against the opposing sleeve wall. These rings which are preferably formed of a suitable elastic material such as Teflon, secure the bearing sleeves to the surrounding supporting sleeves to prevent relative motion between the coupled sleeves.

Within the casing 60 are the two cylindrical cups, each of which is generally designated 90. These cups are in bottom end opposed relation and each has an encircling outer end flange 92 and a circular axially extending chamber 94 which opens through the outer end of the cup. The inner end or bottom end of each cup 90 has the axial passage 96 therethrough which is of materially smaller diameter than the chamber 94 but is of the same diameter as the stirring rod 28 and the bore through the bearing sleeves 74 and 76. Thus there is provided a circular floor surface 98 at the bottom of each cup chamber 94 upon which bears the resilient ring 100. These rings, of course, encircle the stirring rod 28 and are compressed in the bottom of the cup in the manner hereinafter described and for the purpose about to be set forth.

Surrounding the rod 28 and interposed between the inner end of each of the bearing sleeves 74 and 76 and the adjacent ring 100, is a wear or sealing annulus 102. Each sealing annulus has a flat end surface 104 which opposes and is in engagement with a flat end surface 106 of the adjacent bearing sleeve. These opposing and engaging surfaces 104 and 106 are lapped to a smooth finish and form a tight seal against the passage of fluid between them.

The cups 90 which are preferably of Teflon material, are of the same external diameter from the inner sides of their flanges 92 to the opposing bottom or inner ends thereof and the two cups are encircled by the coil spring 108 which bears at its ends against the opposing inner surfaces of the flanges 92. This spring is under constant tension and therefore it is constantly urging the cups to separate and consequently pressure is applied to the resilient rings 100 and to the sealing annuli 102. This forces together the opposing sealing surfaces 104 and 106 between the adjacent bearing sleeve and the sealing annuli 102.

When the shaft 28 is rotated the bearing sleeves 74 and 76 remain stationary together with the sleeves 30, 46, and the casing in which the parts are enclosed but rotary motion is given to the cups 92, the sealing annuli 102, and the rings 100.

Each annulus 102 may also be provided with a suitable external channel for receiving a resilient ring 110 which will frictionally engage the surface of the cup chamber 94 and thus further ensure the rotation of the annulus 102 with the cups.

The bearing sleeves 74 and 76 are formed of organic fibrous material such as wood and are oil impregnated or, preferably, they may be formed of a wood having a natural oil which will provide lubrication between the rod 28 and the surfaces of the bearing sleeves and also between the opposing surfaces 104 and 106.

As an example of a suitable wood for the bearing sleeves, lignum vitae has been found suitable in that it is a hard wood and contains approximately 30 percent of a natural oil.

Each annulus 102 is formed of a hard vitreous material. A suitable material for these elements is synthetic sapphire.

The rod or shaft 28 extending through the assembly just described, is polished to a high degree which further reduces wear upon the bearing sleeves and other parts against which the shaft turns.

It is to be noted that in this assembly none of the rings surrounding the elements bear against rotating parts. The rings 100 and 110, being under compression, form friction couplings between the parts between which they are compressed so that such parts rotate together.

The casing 60 which, as previously stated, is fluid tight, is filled with a suitable sealing liquid. When the present stirring apparatus is used in food or pharmaceutical laboratories it is essential, of course, that the sealing liquid be of a non-toxic nature. Accordingly the sealing liquid of this character which has been found to be suitable for all uses, is a dispersion of Teflon in silicone liquids. This seal liquid is made up of an aqueous solution of Teflon, comprising about 33 percent of Teflon in water, which is mixed in equal proportions with silicone liquid. This mixture of 50 percent of the 33 percent solution of Teflon in water with 50 percent silicone liquid is heated to boiling to boil off or evaporate the water. This results in the above stated dispersion of Teflon in silicone liquid.

By the use of the seal liquid in association with the unique assemblage of the parts as described, there is obtained a positive seal between the rotating shaft 28 and the stationary parts of the apparatus.

The seal liquid within the casing and surrounding the coil spring, cups, etc., is generally designated 110.

The lower or bottom end of the stirrer rod is formed to have a stirrer blade 112 mounted thereon and of suitable form to be introduced into a flask, such as the flask 20, through the narrow neck portion thereof.

From the foregoing it will be readily seen that there is provided by the present invention, in the combination structure disclosed, a novel laboratory stirring system for used with a laboratory flask or other suitable receptacle.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. For use in a laboratory stirring system embodying the use of a flask having a mouth, an elongate sealing sleeve of an elastomer having a tapered end for insertion in, and sealing engagement with, the mouth of a flask and having an axial bore therethrough, a smooth surfaced stirring rod extending through said bore of the sleeve and having rotatable engagement with the surface of the bore, the rod having a lower end extending beyond the tapered end of the sleeve, and a sealing unit comprising at least two members encircling the rod and having engaging sealing surfaces, and one of said members being in stationary sealing connection with said sleeve and the other member being in engagement with, and rotating with, the rod while bearing against the said one member.

2. The invention according to claim 1, wherein the said one member is a fibrous body of organic material and the other member is a non-organic, vitreous material.

3. The invention according to claim 1, wherein the said one member is wood having a relatively high percentage of natural oil and the other member is a vitreous material having a high hardness rating.

4. The invention according to claim 1, wherein the said other member is movable axially of the rod, and means in operative engagement with said other member and constantly urging the same toward said one member to maintain said engaging sealing surfaces in firm contact.

5. Sealing apparatus for use with a laboratory receptacle such as a flask having a mouth, said apparatus comprising an elongate sealing sleeve of an elastomer and having an axial bore therethrough and a tapered lower end portion for insertion into and sealing engagement with the mouth of a flask, a bearing sleeve secured in the upper end portion of said bore, a stirrer rod extending through said bearing sleeve and said sealing sleeve, said bearing sleeve having a top end seal surface, an annular element encircling the rod above said seal surface, said annular element having a lower seal surface bearing upon the first seal surface, means securing said annular element to the stirrer rod for rotation with the rod but permitting movement of the element axially of the rod, and means operatively connected with said annular element and constantly urging the same toward the bearing sleeve to maintain said sealing surfaces in firm sealing engagement one with the other.

6. The invention according to claim 5, wherein the said bearing sleeve consists of an oil containing organic fibrous material and said annular element consists of a hard vitreous material.

7. The invention according to claim 5 with means forming a fluid tight encasement for and around the engaged sealing surfaces of said annular element, said bearing sleeve and the said means maintaining said surfaces in engagement, and a sealing liquid filling said encasement means.

8. The invention according to claim 7, wherein said sealing liquid consists of a dispersion of Teflon in silicone liquid.

9. The invention according to claim 5, wherein said elastomer sleeve is of the synthetic resin Teflon and the said tapered portion thereof has at least one encircling channel in the tapered surface providing two encircling lands capable of distortion under compression against the encircling mouth of the flask to effect a tight coupling with the flask mouth and a fluid tight seal therewith.

10. Sealing apparatus for use with a laboratory receptacle such as a flask having a mouth, said apparatus comprising an elongate sealing sleeve of an elastomer and having an axial passage therethrough and also having a tapered lower end for sealing engagement in the mouth of a flask, a rotary stirring rod extending through said axial passage and having sealing engagement with at least a portion of the surface of said passage, a sealing unit comprising two members encircling the rod and having contacting annular sealing surfaces above the said tapered lower end of said sleeve, a second sleeve encircling and engaging said rod above said sealing unit, a second unit comprising two members encircling the rod and having contacting annular sealing surfaces below the second sleeve, one member of each sealing unit being secured to the adjacent sleeve, the other member of each unit being coupled to the rod to rotate therewith, means coupling said sleeves and maintaining the same in spaced relation, and means interposed between the said other members of said sealing units and urging the same apart whereby the contacting sealing surfaces of each of the units are pressed together.

11. The invention according to claim 10, wherein said means coupling the sleeves include a cylinder spanned at each end by a part of a sleeve and forming with said sleeve parts a sealing casing around the said sealing units, and a sealing liquid filling said casing.

12. The invention according to claim 10, wherein said means interposed between said other members includes the bottom portions of two cup bodies through which the rod extends, each cup body having therein a portion of the said one member of a sealing unit together with the said other member of that unit, and a spring compressed between said cup bodies and urging the latter apart.

13. A sealing apparatus for use in a vertical stirring assembly with a flask having a mouth; said apparatus comprising a lower elongate sealing elastomer sleeve having an externally tapered lower end portion for engagement in a flask mouth and having an axial bore therethrough, a smooth surface stirring rod extending through said sleeve and having rotatable engagement with the surface of a lower end portion of the bore, the sleeve having an encircling top end flange, an elongate lower bearing sleeve secured at one end of the top portion of the sealing sleeve and having a top portion projecting above the top of the sealing sleeve and also having an annular top end sealing surface, said bearing sleeve having an axial bore therethrough aligned with the sealing sleeve bore, a top sealing sleeve having an axial bore therethrough aligned with the bore of said lower sealing sleeve and lower bearing sleeve and having a lower end encircling flange, an elongate upper bearing sleeve secured at an end to said top sealing sleeve and having a bottom portion projecting downward below said upper bearing sleeve and also having an annular bottom end sealing surface, said upper bearing sleeve having an axial bore therethrough aligned with the upper sealing sleeve bore, lower and upper cup members coaxially aligned between the said flanges of said sealing sleeves and having centrally bored opposed bottoms through which the rod extends, the said projecting top and bottom portions of said bearing sleeves extending respectively into the lower and upper cup members and terminating short of the inner bottom surfaces thereof, said rod extending through said bearing sleeves and said upper sealing sleeve, a sealing annulus within each cup member encircling the rod and engaging the annular sealing end surface of the adjacent bearing sleeve, an expansion spring encircling said cup members and attached at its ends to the remotely related ends of the cup members and urging the latter apart and pressing the sealing annuli into sealing engagement with the opposing bearing sleeve sealing end surfaces, a casing cylinder between and secured in fluid tight end engagement with the said flanged ends and flanges of said sealing sleeves and enclosing said cups and spring, and a sealing liquid filling said casing cylinder.

14. The invention as defined by claim 13 wherein the said sealing liquid consists of a liquid dispersion of Teflon in a silicone liquid.

15. The invention as defined by claim 14, wherein the liquid dispersion of Teflon in the silicon liquid is prepared by mixing equal proportions of a 33% Teflon in water solution and silicon liquid and removing the water from the mixture by boiling.

16. The invention according to claim 13 wherein the upper sealing sleeve is an elastomer, and means constricting the elastomer sealing sleeves around the rod in the remotely related end portions of the sleeves.

17. The invention as defined by claim 13, wherein said casing cylinder is transparent for observing the sealing liquid therein, collars enclosing the ends of said casing and the said flanges, and connecting elements between said collars.

References Cited by the Examiner
UNITED STATES PATENTS

| | | | |
|---|---|---|---|
| 2,218,839 | 10/1940 | Armstrong et al. | 277—4 |
| 2,669,370 | 2/1954 | Royall | 215—47 |
| 2,787,448 | 4/1957 | Fawcett | 259—134 |
| 2,816,743 | 12/1957 | Kirkland | 259—134 |
| 2,829,931 | 4/1958 | De Pree et al. | 308—36.1 |
| 2,901,295 | 8/1959 | Becker | 259—108 |
| 2,907,189 | 10/1959 | Flieg | 64—15 |
| 2,918,264 | 12/1959 | Ackles | 259—134 |
| 2,979,925 | 4/1961 | Hungerford | 64—15 |
| 3,006,494 | 10/1961 | Riebeling | 215—47 |
| 3,084,943 | 4/1963 | Weis | 277—4 |
| 3,169,014 | 2/1965 | Wilson et al. | 259—107 |

CHARLES A. WILLMUTH, *Primary Examiner.*

EDWARD L. ROBERTS, JR., *Assistant Examiner.*